United States Patent
Buswell

(10) Patent No.: US 11,513,809 B2
(45) Date of Patent: *Nov. 29, 2022

(54) KERNEL-INTEGRATED INSTANCE-SPECIFIC OPERATIONAL RESOURCES WITH VIRTUALIZATION

(71) Applicant: International Business Machines Corporation, Armonk, NY (US)

(72) Inventor: John I. Buswell, Athens, OH (US)

(73) Assignee: International Business Machines Corporation, Armonk, NY (US)

(*) Notice: Subject to any disclaimer, the term of this patent is extended or adjusted under 35 U.S.C. 154(b) by 597 days.

This patent is subject to a terminal disclaimer.

(21) Appl. No.: 16/155,722

(22) Filed: Oct. 9, 2018

(65) Prior Publication Data

US 2019/0050235 A1 Feb. 14, 2019

Related U.S. Application Data

(63) Continuation of application No. 15/149,995, filed on May 9, 2016, now Pat. No. 10,127,049.

(51) Int. Cl.
| | |
|---|---|
| G06F 9/44 | (2018.01) |
| G06F 9/4401 | (2018.01) |
| G06F 8/61 | (2018.01) |
| G06F 9/455 | (2018.01) |

(52) U.S. Cl.
CPC ............ *G06F 9/4406* (2013.01); *G06F 8/63* (2013.01); *G06F 9/4416* (2013.01); *G06F 9/45558* (2013.01); *G06F 2009/45562* (2013.01); *G06F 2009/45575* (2013.01); *G06F 2009/45595* (2013.01)

(58) Field of Classification Search
CPC ................................. G06F 8/63; G06F 9/4416
See application file for complete search history.

(56) References Cited

U.S. PATENT DOCUMENTS

| | | | |
|---|---|---|---|
| 7,120,786 B2 | 10/2006 | Miller et al. | |
| 8,086,836 B2 | 12/2011 | Chong et al. | |
| 8,291,209 B2 | 10/2012 | Chong et al. | |
| 9,804,855 B1* | 10/2017 | Paningipalli | G06F 9/4406 |
| 2006/0190933 A1* | 8/2006 | Tzeng | G06F 8/20 717/140 |
| 2012/0102159 A1* | 4/2012 | Luo | G06F 9/4416 709/220 |

(Continued)

FOREIGN PATENT DOCUMENTS

EP 2043320 A1 * 4/2009 ........... G06F 9/4416

OTHER PUBLICATIONS

IBM, List of IBM Patents or Patent Applications Treated as Related, Applicant Appendix, Oct. 9, 2018, pp. 1-2, the contents of which are incorporated herein by reference in their entirety.

(Continued)

*Primary Examiner* — Danny Chan
(74) *Attorney, Agent, or Firm* — Rachel M. Yadlosky

(57) ABSTRACT

A network boot of a platform-specific operating system kernel is performed from a compressed platform-specific operating system kernel. The platform-specific operating system kernel, when booted, dynamically builds from the compressed platform-specific operating system kernel a bootable file system and boots application code. An application is loaded from the bootable file system.

21 Claims, 10 Drawing Sheets

(56) References Cited

U.S. PATENT DOCUMENTS

| | | | | |
|---|---|---|---|---|
| 2012/0303762 | A1* | 11/2012 | Geiser | G06F 9/4416 709/219 |
| 2013/0290694 | A1* | 10/2013 | Civilini | H04L 41/0806 713/2 |
| 2014/0281463 | A1 | 9/2014 | Even et al. | |
| 2014/0372744 | A1 | 12/2014 | Xu et al. | |
| 2015/0120669 | A1* | 4/2015 | Ibanescu | G06F 8/61 707/649 |
| 2015/0128245 | A1 | 5/2015 | Brown et al. | |
| 2015/0142919 | A1 | 5/2015 | Lee et al. | |
| 2015/0149756 | A1 | 5/2015 | Ge | |
| 2016/0019117 | A1* | 1/2016 | Kumarasamy | G06F 9/4406 707/650 |
| 2017/0322815 | A1 | 11/2017 | Buswell | |
| 2018/0260009 | A1* | 9/2018 | Roeder | G06F 9/4403 |

OTHER PUBLICATIONS

Author Unknown, Parallelizing Dump and Operating System Boot in a Virtualized Environment, Technical Disclosure No. IPCOM000223159D, Nov. 5, 2012, pp. 1-11, IP.com, Published at: http://ip.com/IPCOM/000223159.

Author Unknown, Design and Implementation of Packet Socket Based Zero Framework in Linux, Technical Disclosure No. IPCOM000214400D, Jan. 25, 2012, pp. 1-6, IP.com, Published at: http://ip.com/IPCOM/000214400.

Author Unknown, System and Apparatus for Sharable Common Operating System in Cloud Computing, Technical Disclosure No. IPCOM000208801D, Jul. 18, 2011, pp. 1-7, IP.com, Published at: http://ip.com/IPCOM/000208801.

Author Unknown, Technique for optimal virtual image placement in a "cloud-based" office, Technical Disclosure No. IPCOM000216226D, Mar. 26, 2012, pp. 1-3, IP.com, Published at: http://ip.com/IPCOM/000216226.

Author Unknown, Method to Eliminate Guest VM Data in Host Kernel Dump Using Dynamic Taint Tracking, Technical Disclosure No. IPCOM000235053D, Feb. 26, 2014, pp. 1-4, IP.com, Published at: http://ip.com/IPCOM/000235053.

Zhenhua Li, et al., Efficient Batched Synchronization in Dropbox-like Cloud Storage Services, In Proceedings of ACM/IFIP/USENIX 14th International Middleware Conference, Lecture Notes in Computer Science, Dec. 9, 2013, pp. 307-327, Springer Berlin Heidelberg, Beijing, China.

Albert C. Wang, Examiner, United States Patent and Trademark Office, Office Action for U.S. Appl. No. 15/149,995, filed Dec. 15, 2017, pp. 1-11, Alexandria, VA, USA.

Albert C. Wang, Examiner, United States Patent and Trademark Office, Notice of Allowance for U.S. Appl. No. 15/149,995, filed Jul. 6, 2018, pp. 1-6, Alexandria, VA, USA.

Mell et al., "The NIST Definition of Cloud Computing," Recommendations of the National Institute of Standards and Technology, U.S. Department of Commerce, Special Publication 800-145, Sep. 2011, 7 pages.

* cited by examiner

KERNEL-INTEGRATED INSTANCE-SPECIFIC OPERATIONAL RESOURCES WITH VIRTUALIZATION

BACKGROUND

The present invention relates to resource efficiency improvement and reliability within virtualized computing environments, such as cloud computing environments. More particularly, the present invention relates to kernel-integrated instance-specific operational resources with virtualization.

Prior virtualized computing environments utilized a kernel, such as a Linux® computer operating system kernel distribution, that relied upon a separately-provisioned virtualized file system to be present within a computing platform for operational functionality of the kernel to be established. These prior virtualized computing environments utilized a boot loader executable program of the cloud provider platform that was configured to have the kernel passed in during boot loading from an external location. The boot loader was further configured with information regarding a location of an initial random access memory (RAM) disk (initrd) file that had a parameter that was passed to the kernel to inform the kernel to use an initial RAM file system (initramfs) as a base operating file system. The initramfs was also located outside of the kernel. Within these prior virtualized computing environments, an inability of the boot loader or kernel to locate any of the externally-located resources (e.g., initrd, initramfs, etc.) within the virtualized computing environment resulted in a boot loading failure and resulted in an inoperative kernel.

SUMMARY

The technology described herein addresses and resolves certain problems that exist within prior virtualized computing environments and that were identified for the first time by the inventor of the subject matter described herein.

A computer-implemented method includes providing a compressed platform-specific operating system kernel that allows a network boot of a platform-specific operating system kernel from the compressed platform-specific operating system kernel that when booted over a network dynamically builds from the compressed platform-specific operating system kernel a bootable file system and boots application code. The compressed platform-specific operating system kernel includes an application interface code library, and integrated operating system kernel tools. An application is loaded from the bootable file system.

A system that performs this computer-implemented method and a computer program product that causes a computer to perform the computer-implemented method are also described.

An advantage of the technology described herein as recognized by the inventor is that this technology provides a single distributed kernel image embedded with all resources (e.g., file system, libraries, a boot manager, an application manager, etc.) for kernel operational functionality so that the embedded boot manager has access to all resources within the single distributed kernel image to successfully boot the embedded kernel with an operational file system by reference to the single kernel image itself, and without reliance upon external kernel references or external kernel operational resource availability.

As available options, the compressed platform-specific operating system kernel may be a compressed platform-specific Linux® computer operating system kernel, the application interface code library may be a GNU GLIBC library, and the integrated operating system kernel tools may be BusyBox tools. By extraction of platform-specific implementations of distributed products such as these for use in the compressed platform-specific operating system kernel, testing and deployment of the compressed platform-specific operating system kernel may be expedited.

As another option, the compressed platform-specific operating system kernel may include support for running a virtual machine and the application may be a virtual machine (VM). The support for running the virtual machine may provide a dynamic cloud computing environment supporting multiple VMs. This alternative has a distinct advantage that the compressed platform-specific operating system kernel may be deployed within a cloud computing environment and may directly support one or more VMs rather than relying upon a cloud-hosted VM hosting platform.

Another option of the present technology is that the provided platform-specific operating system kernel may be upgraded during runtime without taking a platform upon which the platform-specific operating system kernel is executing or the application out of service. This advantageously allows runtime replacement of the platform-specific operating system kernel and the virtual machine support within a running system without restarting the hardware platform upon which the platform-specific operating system kernel is executing, which, in turn, provides improved uptime and availability within complex computing environments.

As a further option, a boot manager that is integrated within the compressed platform-specific operating system kernel may be provided and may be utilized to prepare local cloud storage, networking, and firewall support for a plurality of cloud providers. Providing the boot manager within the compressed platform-specific operating system kernel ensures that all components of the kernel may be booted remotely by the network boot without reliance, as required by prior technologies, on a conventional platform-hosted boot loader to identify and access the respective components outside of a kernel image.

As an additional option, providing the image of the compressed platform-specific operating system kernel enables unilateral provisioning of an operational kernel and operating file system within a cloud computing environment, with support for running virtual machines. This advantageously allows runtime network deployment of a fully-functional kernel within a highly-virtualized environment.

DETAILED DESCRIPTION

Figure 1:
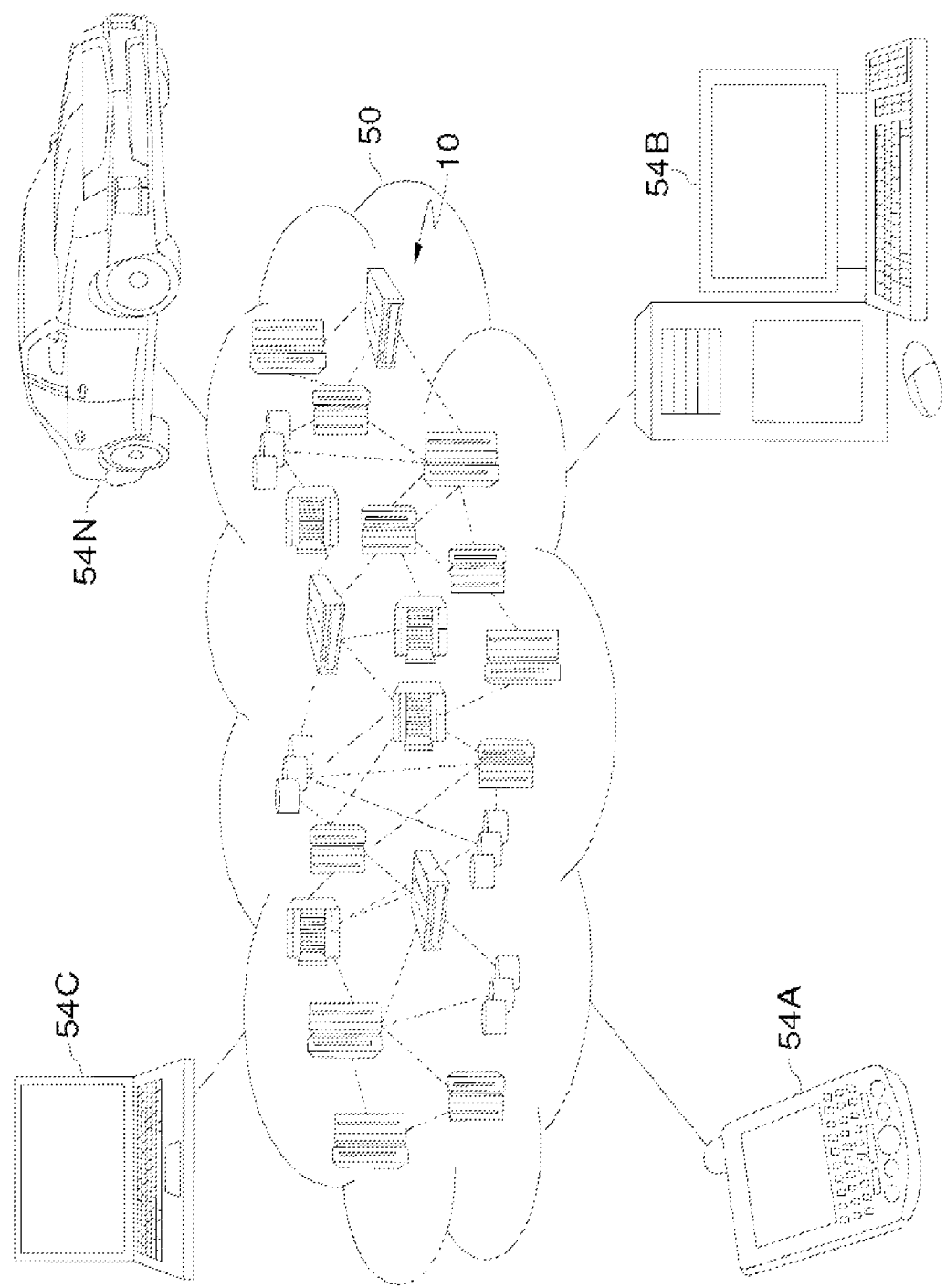
FIG. 1 depicts a cloud computing environment according to an embodiment of the present invention.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides kernel-integrated instance-specific operational resources with virtualization. The present technology was conceived and results from recognition of several problems that exist within previous highly-virtualized environments. The technology described herein identifies and provides solutions to these several problems, each of which will be described further below after an introduction of certain technical details of the technology described herein.

As a preliminary matter, the technology described herein operates by providing a compressed platform-specific operating system kernel that allows a network boot of a platform-specific operating system kernel from the compressed platform-specific operating system kernel that when booted over a network dynamically builds from the compressed platform-specific operating system kernel a bootable file system and boots application code, where the compressed platform-specific operating system kernel includes an application interface code library, and integrated operating system kernel tools. An application is loaded from the bootable file system.

For purposes of the description herein, the terms "compressed platform-specific operating system kernel" and "resource-embedded bootable kernel image" (alternatively termed "image" and "image file" herein for brevity) are defined to be a platform-tuned and payload-tuned deployable image file that integrates all operational resources utilized by an incorporated kernel to be fully booted to a functional state and utilized by one or more incorporated applications/virtualization engines that execute on top of the booted kernel, including management and monitoring applications. All operational resources are integrated within and deployable via the image file in compressed format. Specifically, the resource-embedded bootable kernel image includes a customized platform and payload-specific operating system kernel, the kernel's own boot manager, a bootable filesytem, an application interface code library (e.g., GNU® GLIBC library), and integrated operating system kernel utilities and libraries (e.g., tools such as Busybox). The resource-embedded bootable kernel image may further include support for running and monitoring an application and/or a virtual machine. The image may be booted using a network boot, such as by invocation of a platform boot loader to boot the image. Once the image is booted over a network, the embedded boot manager may load the platform and payload-specific kernel from the single resource-embedded bootable kernel image within a complex virtualized environment by reference to the single kernel image, and without reliance upon availability of external operational system resources because external resources are not referenced by the resource-embedded bootable kernel or by the image. Once booted, the kernel dynamically builds from the booted image the bootable file system and boots application code or a virtualization engine, along with management and monitoring code.

As such, the technology described herein integrates a lightweight operating system, a lightweight management application, and a cloud provider platform-tuned kernel into a single compressed kernel image (e.g., an operating system kernel file, such as a bzImage file). This integration places the entire operating system platform within a very small footprint, with the compressed platform-specific operating system kernel being provided within a single image file of a size less than or equal to sixteen Megabytes (16 MB) or less. Advantages of this compressed deployed image are that it reduces storage space and reduces distribution bandwidth requirements. Further, as noted, the image is "resource tuned" to a particular virtualization platform and to the resources utilized by the payload (e.g., application(s), virtualization engine, management and monitoring applications, etc.) to further increase resource usage efficiency across different virtualization platforms. The compressed platform-specific operating system kernel allows for a network boot of a fully functional instance of the kernel and of multiple integrated applications from the single image file.

Advantages over existing solutions include the lightweight nature of the system. For example, the deployed image may be as much as ten times (10×) smaller than conventional deployments. Further, the deployed image may use significantly fewer resources in view of the resource tuning for the platform and payload. The resource-embedded kernel instance instantiated from the resource-embedded bootable kernel image may additionally be quickly updated/replaced without having to reboot the platform upon which the instance is executing. Further advantages of the optimized integration of the kernel image are that the efficient/tailored resource utilization improves/maximizes the virtualized resources that are available to an application on each cloud instance on which the image is deployed.

It should be noted that the technology described herein leverages image file processing and image file content, each in a new manner, to facilitate a reliable network boot of a fully-operational kernel from the resource-embedded bootable kernel image. It should also be noted that the technology described herein does not utilize the industry standard initial ramdisk ("initrd"), which is conventionally used to bootstrap what is stored on a disk at the target platform. In contrast to previous technologies, the technology described herein places an entire minimal operating system on initrd "within" the resource-embedded bootable kernel image to provide guaranteed access to the minimal operating system during the boot sequence. As such, conventional deployment risks associated with unavailability of an externally-referenced operating system/disk are removed by the technology described herein.

One or more applications may also be placed directly within the resource-embedded bootable kernel image, as permitted by licensing for authorized distribution. Alternatively, the boot manager within the image file or the kernel itself may access and pull in extra images and software where licensing restrictions prevent integration into the image, and may load them separately, as appropriate for a given implementation. Each of the technical alternatives provides improved reliability over conventional solutions because operational functionality provided within the resource-embedded bootable kernel image itself controls booting and loading of resources without reliance upon availability or functionality of platform-provided resources (e.g., boot loader, operating system, etc.). As such, the technology described herein provides an extensible and autonomous solution for reliable operational image deployments within highly-virtualized environments.

It should be noted that the examples described below utilize features specific to the Linux® computer operating system and kernel for purposes of description. However, it is understood that the technology described herein may be applied to other operating system platforms and kernels, such as Berkeley Software Distribution (BSD) kernels and Solaris kernels, as appropriate for a given implementation.

As introduced above, the single resource-embedded bootable kernel image includes each of a cloud provider-optimized kernel configuration (e.g., ".config"), a lightweight operating system image that includes the common libraries and tools to support applications, its own boot manager, an application manager, and a monitor. These components may each be stored within a copy in and out (CPIO) compressed archive format, and may be compressed using any compression algorithm appropriate for a given implementation (e.g., a Lempel and Ziv Modified Compression algorithm (LZMA) or other supported compression algorithm. The compressed archive may be embedded into the kernel image using an "initramfs" operation, which allows storage of the operating system inside the kernel and provides an initial file system reference when unpacked by the kernel. These operating system files within the CPIO archive may be further compressed to allow larger applications to be installed within the same footprint by using operations such as "squashfs" or similar compressed file systems via loopback.

Because of the single-image embedding of all resources utilized by the kernel, the kernel may be upgraded during runtime (e.g., on the fly) without requiring the underlying virtualized platform to be restarted and without taking the platform upon which the platform-specific operating system kernel is executing or the application out of service. An advantage of the runtime upgrade capabilities provided by the present technology is improved availability and throughput of deployed applications because the kernel and the executing application(s) may be updated more rapidly and without impacting execution of other instances.

The run-time upgrade process may be performed by replacing the running kernel using an "exec" operation. A new "bzImage" file may be loaded using an operation, such as "kexec -1 bzImage.new," followed by execution of the new image using a "kexec -e" operation. As such, the embedded boot manager further operates on the virtualization platform to replace conventional "SysVinit" or "system" operations, thereby rendering these conventional operations obsolete, which again improves reliability.

Further, because each cloud platform instance has a standard set of virtual hardware selected and provisioned by the respective cloud provider, the kernel configuration may be static, and may be optimized for the specific cloud provider platform and provisioned virtual hardware. This optimization of resource mappings may further reduce the kernel footprint, and may reduce the risk of security/bug related problems because code that references unused/unavailable virtual hardware may be omitted resulting in less code running within the kernel.

The boot manager embedded within the resource-embedded bootable kernel image is responsible for preparing the local cloud storage, networking, and firewall suppport. An advantage of providing the boot manager within the kernel image is that, rather than relying on a generic platform boot loader, the boot manager may be tailored to the resources of the particular kernel image deployment and may manage platform, communication, and security related configuration (s).

During the boot sequence, the boot manager launches the kernel using the resource-embedded bootable kernel image. Then the kernel launches and monitors the application manager and other resources (e.g., a monitoring application), as described in more detail below. The application manager is responsible for ensuring that the application and content are valid (either local storage or remotely managed storage), and is responsible for then launching the application that runs on top of the kernel. The boot manager may be configured to support multiple cloud providers.

The technology described herein further optionally integrates a virtualization engine (e.g., hypervisor, etc.) into the kernel, and boots the virtualization engine on the virtual hardware using a network boot, such as a preboot execution environment (PXE). This feature is technically possible because the virtualization engine and the kernel are integrated into the single resource-embedded bootable kernel image file that may be booted over the PXE. The advantage this technology has over the conventional solutions is that no local storage is required to be provisioned in advance on the cloud platform. As a result, a cloud provider may use this platform without provisioning local storage on each node, and may instead use a network storage solution such as Internet small computer systems interface (iSCSI) for storage of the source virtual machines.

This feature may be implemented by taking a hardware-optimized kernel configuration with module support disabled (also optional), a very lightweight set of libraries and tools (e.g., libraries and library dependencies for the selected virtualization engine), a virtualization engine (e.g., a kernel-based virtual machine (KVM)), and optionally a kernel-hosted virtual machine monitor (e.g., quick emulator (QEMU, collectively KVM/QEMU)).

These elements may be stored into a mock file system directory, and a management application may be used as the initialization (/init) application within that directory, such as to load/configure the system using dynamic host configuration protocol (DHCP) as an example. The mock directory may then be used as the source to build and compress a CPIO archive. The kernel configuration may be modified to use that archive for the initial file system (e.g., initramfs) operations and a small-sized initial file system may be selected that is large enough for the file system directory. The kernel may then be built with that configuration, and the resulting resource-embedded bootable kernel image (e.g., an operating system kernel file, such as a bzImage file) may be loaded into a respective server (e.g., PXE/DHCPD/BOOTP server) with a media access control (MAC) address of the servers that use the image file. The compressed platform-specific operating system kernel when booted over the network may use initramfs to dynamically build the bootable file system from within the image. An advantage of the kernel using initramfs to reference the integrated file system within the image is reliability during the remote network boot sequence. When these servers are booted up, they may use that address (PXE/BOOTP) on the Network Interface Card (NIC) to load the resource-embedded bootable kernel image file from the boot server, and may then boot the kernel from the image, boot the management application from within the image, obtain the network configuration via DHCP, and load and monitor the virtualization engine from within the image. At this point local or network storage may be used to load virtual machines (VMs) to run on the virtualization engine, or VMs may be booted in a similar manner over the network.

It should be noted that while the technology described herein utilizes a single bootable image, alternatives are possible. For example, if a portion of the payload is stored on a disk (e.g., such as where an application utilizes a component that is too large for the preferred size of the compressed kernel image file), then the boot manager that forms a portion of the bootable compressed kernel image may fetch any such component(s) as part of its boot control and may install the respective component(s) on local storage with the uncompressed kernel rather than having the respective application or virtual machine engine completely within the kernel image. Within this alternative implementation, it should be noted that the boot operation remains under the control of the boot manager that is part of the resource-embedded bootable kernel image and does not rely upon a platform-based boot loader to perform the designated operations, which again increases reliability of this alternative of the technology described herein.

As introduced above, it should be noted that conception of the present subject matter resulted from recognition of and solutions based upon certain limitations associated with previous highly-virtualized environments. For example, regarding problems recognized and solved by the technology described herein, it was observed that kernel operational problems occurred within previous highly-virtualized environments due to an unavailability of operational resources (e.g., file system, libraries, etc.) needed for kernel operational functionality, such as where the needed resources were being used by other operating instances or were unable to be located as referenced by the compiled kernel.

The technology described herein solves the recognized problem of resource unavailability by providing a new form of a distributed resource-embedded bootable kernel image that includes an embedded/compressed bootable platform-specific kernel and that includes the operational resources (e.g., file system, libraries, etc.) usable to allow the kernel to be booted over a network to a fully functional operational status without use of external references, and to thereby be operational to load applications and/or virtual machines. As such, the technology described herein may provide an operational kernel under circumstances that may otherwise previously have lacked operational system resources, and that as a result would previously have prevented kernel operation.

It was additionally observed that previous operating system architectures (e.g., the Linux® computer operating system) are inefficient when utilized within a virtualized or cloud computing environment due to external references and other aspects of the architectures that are not used on certain platforms. To resolve the observed resource inefficiencies, the embedded platform-specific kernel described herein may be tailored to (e.g., customized for) a specific virtualized computing environment/platform by omitting unused resources from a benchmarked/released kernel distribution that would otherwise have been distributed by prior kernel deployments. As such, the technology described herein further avoids unnecessary consumption of resources that would previously have been consumed by a kernel without actually being used. The bootable platform-specific kernel may be reliably booted from a single image file and may utilize resources more efficiently than previous conventional kernel deployments.

The present technology additionally solves several other recognized and related problems that result from virtualized and cloud-based operating system resources being allocated generally and equally to any image/application that may be instantiated and executed. It was observed that the general/equal allocation of operating system resources to instances within virtualized environments wasted or inefficiently used finite resources of cloud computing platforms because the same quantity of resources were allocated for each booted image irrespective of what resources were actually being utilized by the respective booted images. It was additionally observed that this inefficient allocation and thereby consumption of resources deprived applications of needed resources, thereby starving cloud-based applications of resources and slowing execution of these applications.

The technology described herein solves these additional recognized problems associated with general/equal allocation of system resources to any image/application that may be instantiated and executed in part through the embedding of the kernel-specific operational system resources within the kernel image, as described above, but additionally enhances this solution by profiling the specific resource needs of the respective payload of the image and tailoring those embedded operational system resources to the specific resource needs of the respective payload of the image. By minimizing the operational resources within the image to those specifically utilized by the payload operations of the image, the resulting resource-embedded bootable kernel image may be considerably smaller in size than prior kernel deployments, which conserves storage space and bandwidth for distribution of the image. Additionally, given the same or similar finite resources on a cloud computing platform, by decreasing resource consumption by kernel instances, the technology described herein increases resource availability to the applications running in the cloud, thereby allowing increased application execution potential for applications, increased operational throughput for applications, and increased application occupancy within cloud-based computing systems.

The present technology additionally solves recognized problems that resulted from previous cloud-based systems that provided and/or relied upon a separate virtualization engine (e.g., hypervisor, etc.) to boot virtual machines. It was observed that because the previous cloud-based systems utilized separate virtualization engines, resource availability again relied upon availability of and access to resources that were outside of an instantiated kernel image or boot location of the kernel, and that conventional solutions required local storage in order to provide operational virtualization platforms. It was additionally observed that while hardware redundancy techniques (e.g., redundant array of inexpensive disks (RAID), etc.) may help reduce the risk of resource unavailability, these solutions do not provide guaranteed resource availability for any given operational instance. It was further determined that upgrade and/or replacement of previous virtualization engines required a restart of the underlying virtualization computing platform.

In view of these several additional observations, it was determined that providing a virtualization engine within the deployed single resource-embedded bootable kernel image would further reduce risks of resource unavailability within virtual and cloud computing environments. The technology described herein further allows the kernel and the virtualization engine to be replaced and restarted ("on the fly") without requiring a restart of the cloud computing platform. As such, the technology described herein addresses and resolves these additional problems of reliability and guaranteed uptime of virtualization platforms within virtual and cloud computing environments.

As such, the present subject matter improves highly-virtualized environments by providing for kernel-integrated instance-specific operational resources with virtualization, as described above and in more detail below. Improved reliability and maintenance of highly-virtualized environments may be obtained through use of the present technology.

The kernel-integrated instance-specific operational resources with virtualization described herein may be performed in real time to allow prompt assured instantiation of an operational kernel within a virtualized environment, on the fly, and without requiring a restart of the virtualized platform. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art. The drawings that follow provide technical details usable to implement the technology described herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
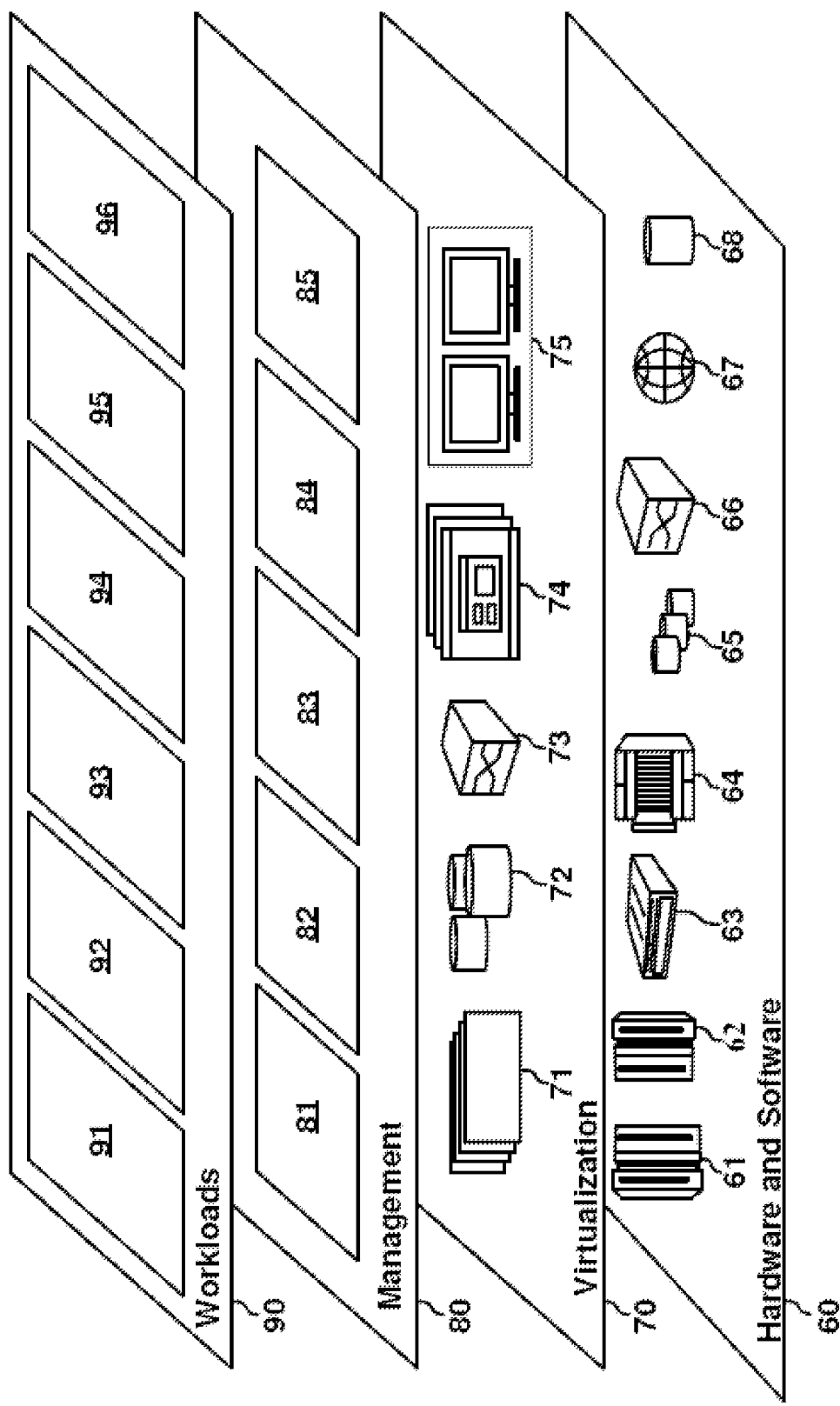
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and kernel-integrated instance-specific operational resources with virtualization 96.

As described above, the present technology may provide the image of the compressed platform-specific operating system kernel and may enable unilateral provisioning of an operational kernel and an operating file system within a cloud computing environment, with support for running virtual machines. An advantage of this technology is that it avoids reliance upon availability of resources at the deployment machine because the resources (e.g., operating file system) are integrated into and deployed with the kernel.

Figure 3:
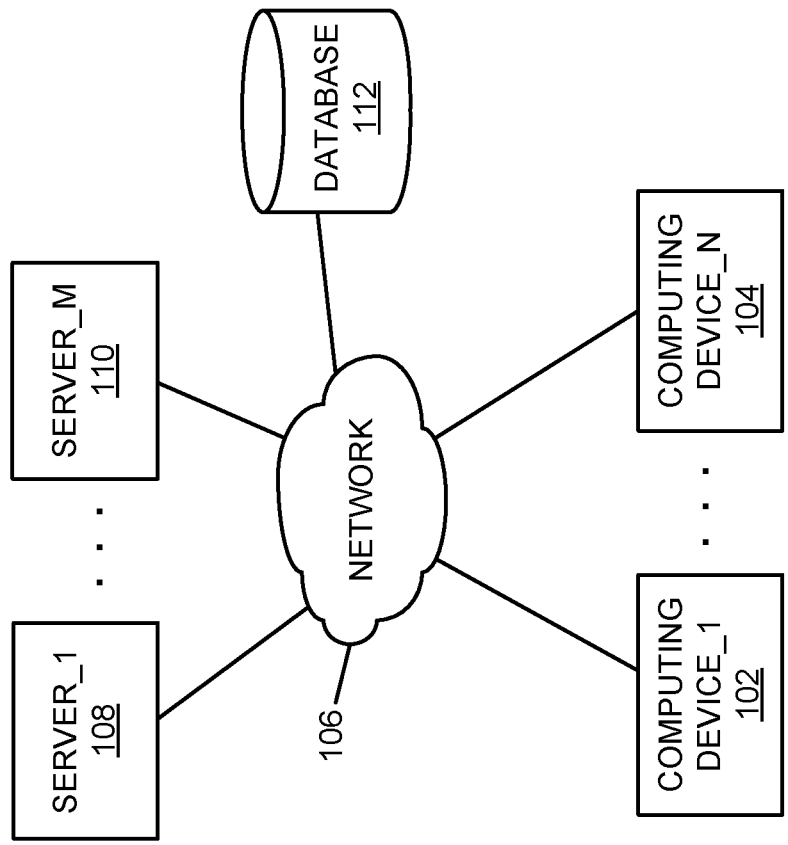
FIG. 3 is a block diagram of an example of an alternative implementation of a system for kernel-integrated instance-specific operational resources with virtualization according to an embodiment of the present subject matter.

FIG. 3 is a block diagram of an example of an alternative implementation of a system 100 for kernel-integrated instance-specific operational resources with virtualization. A computing device_1 102 through a computing device_N 104 communicate via a network 106 with several other devices. The other devices include a server_1 108 through a server_M 110, and a database 112.

The database 112 may store one or more resource-embedded bootable kernel images for distribution within the system 100. Each compressed platform-specific operating system kernel may be provided within a single image file. The image file may be loaded and booted onto any of the respective computing devices 102-104 and servers 108-110 over the network 106 using a network interface card (NIC) from a preboot execution environment (PXE) server supporting dynamic host configuration protocol (DHCP) and a bootstrap protocol (BOOTP). An advantage of this approach to loading over a network is that it facilitates remote management of deployment and replacement of bootable kernel images that incorporate all resources utilized to ensure a successful remote network boot of the kernel.

As will be described in more detail below in association with FIG. 4 through FIG. 8B, the computing device_1 102 through the computing device_N 104 and/or the server_1 108 through the server_M 110 may each provide automated kernel-integrated instance-specific operational resources with virtualization. The automated kernel-integrated instance-specific operational resources with virtualization is based upon distribution and network booting of a resource-embedded bootable kernel image, as described above and in more detail below. As such, the present technology may be implemented at a user computing device or server device level, or by a combination of such devices as appropriate for a given implementation. A variety of possibilities exist for implementation of the present subject matter, and all such possibilities are considered within the scope of the present subject matter.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The database 112 may include a relational database, an object database, or any other storage type of device. As such, the database 112 may be implemented as appropriate for a given implementation.

Figure 4:
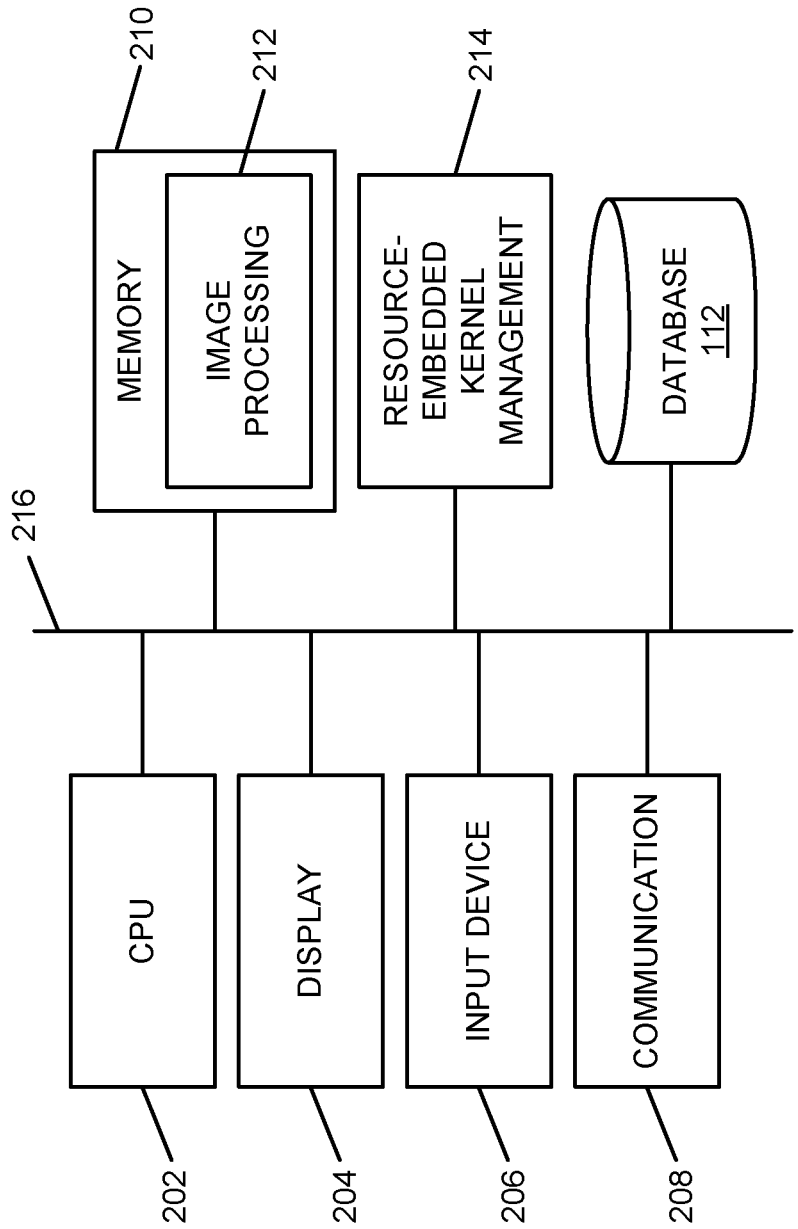
FIG. 4 is a block diagram of an example of an implementation of a core processing module capable of performing kernel-integrated instance-specific operational resources with virtualization according to an embodiment of the present subject matter.

FIG. 4 is a block diagram of an example of an implementation of a core processing module 200 capable of performing kernel-integrated instance-specific operational resources with virtualization. The core processing module 200 may be associated with any of the cloud computing nodes 10, the computing device_1 102 through the computing device_N 104, and the server_1 108 through the server_M 110, as appropriate for a given implementation. As such, the core processing module 200 is described generally herein, though it is understood that many variations on implementation of the components within the core processing module 200 are possible and all such variations are within the scope of the present subject matter. Further, the core processing module 200 may be implemented as an embedded processing device with circuitry designed specifically to perform the processing described herein as appropriate for a given implementation.

Further, the core processing module 200 may provide different and complementary processing of kernel-integrated instance-specific operational resources with virtualization in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor") provides hardware that performs computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, voice command processing unit, or any other type of input device by which the user may interact with and respond to information on the display 204.

A communication module 208 provides hardware, protocol stack processing, and interconnection capabilities that allow the core processing module 200 to communicate with other modules within the system 100. The communication module 208 may include any electrical, protocol, and protocol conversion capabilities useable to provide interconnection capabilities, as appropriate for a given implementation. As such, the communication module 208 represents a communication device capable of carrying out communications with other devices.

A memory 210 includes an image processing area 212 that provides processing and storage space for information associated with one or more resource-embedded bootable kernel images in association with the core processing module 200. For example, the image processing area 212 may store platform-specific and/or payload-specific profile information derived and usable for the creation of one or more resource-embedded bootable kernel images, and may store created resource-embedded bootable kernel images either for deployment (e.g., to the database 112) or as deployed to the image processing area 212 for instantiation. As will be described in more detail below, information stored within the image processing area 212 may be used to create and instantiate a fully-operational kernel from the resource-embedded bootable kernel image.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A resource-embedded kernel management module 214 is also illustrated. The resource-embedded kernel management module 214 provides image-tailored platform-specific and payload-specific profiling for kernels, applications, and virtualization engines and/or virtual machines, provides resource-embedded bootable kernel image creation and deployment, and provides other management activities as appropriate for the core processing module 200, as described above and in more detail below. The resource-embedded kernel management module 214 implements the automated kernel-integrated instance-specific operational resources with virtualization of the core processing module 200.

It should also be noted that the resource-embedded kernel management module 214 may form a portion of other circuitry described without departure from the scope of the present subject matter. The resource-embedded kernel management module 214 may form a portion of an interrupt service routine (ISR), a portion of an operating system, or a portion of an application without departure from the scope of the present subject matter. The resource-embedded kernel management module 214 may also be implemented as an embedded device with circuitry designed specifically to perform the processing described herein as appropriate for a given implementation.

The database 112 is again shown within FIG. 2 associated with the core processing module 200. As such, the database 112 may be operatively coupled to the core processing module 200 without use of network connectivity, as appropriate for a given implementation.

The CPU 202, the display 204, the input device 206, the communication module 208, the memory 210, the resource-embedded kernel management module 214, and the database 112 are interconnected via an interconnection 216. The interconnection 216 may include a system bus, a network, or any other interconnection capable of providing the respective components with suitable interconnection for the respective purpose.

Though the different modules illustrated within FIG. 4 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. Many other possible arrangements for components of the core processing module 200 are possible and all are considered within the scope of the present subject matter. It should also be understood that, though the database 112 is illustrated as a separate component for purposes of example, the information stored within the database 112 may also be stored within the memory 210 without departure from the scope of the present subject matter. Accordingly, the core processing module 200 may take many forms and may be associated with many platforms.

FIG. 5 through FIG. 8B described below represent example processes that may be executed by devices, such as the core processing module 200, to perform the automated kernel-integrated instance-specific operational resources with virtualization associated with the present subject matter. Many other variations on the example processes are possible and all are considered within the scope of the present subject matter. The example processes may be performed by modules, such as the cloud computing nodes 10 or other computing platform, as appropriate for a given implementation. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

Figure 5:
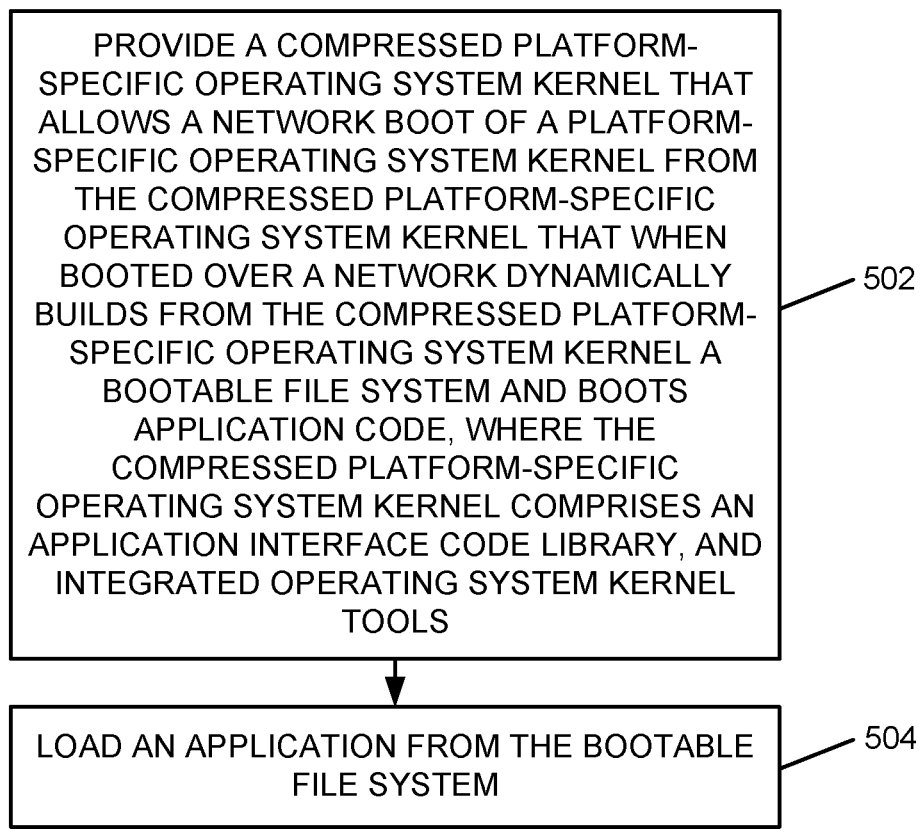
FIG. 5 is a flow chart of an example of an implementation of a process for kernel-integrated instance-specific operational resources with virtualization according to an embodiment of the present subject matter.

FIG. 5 is a flow chart of an example of an implementation of a process 500 for kernel-integrated instance-specific operational resources with virtualization. The process 500 represents a computer-implemented method of performing the subject matter described herein. At block 502, the process 500 provides a compressed platform-specific operating system kernel that allows a network boot of a platform-specific operating system kernel from the compressed platform-specific operating system kernel that when booted over a network dynamically builds from the compressed platform-specific operating system kernel a bootable file system and boots application code, where the compressed platform-specific operating system kernel comprises an application interface code library, and integrated operating system kernel tools. At block 504, the process 500 loads an application from the bootable file system.

Figure 6:
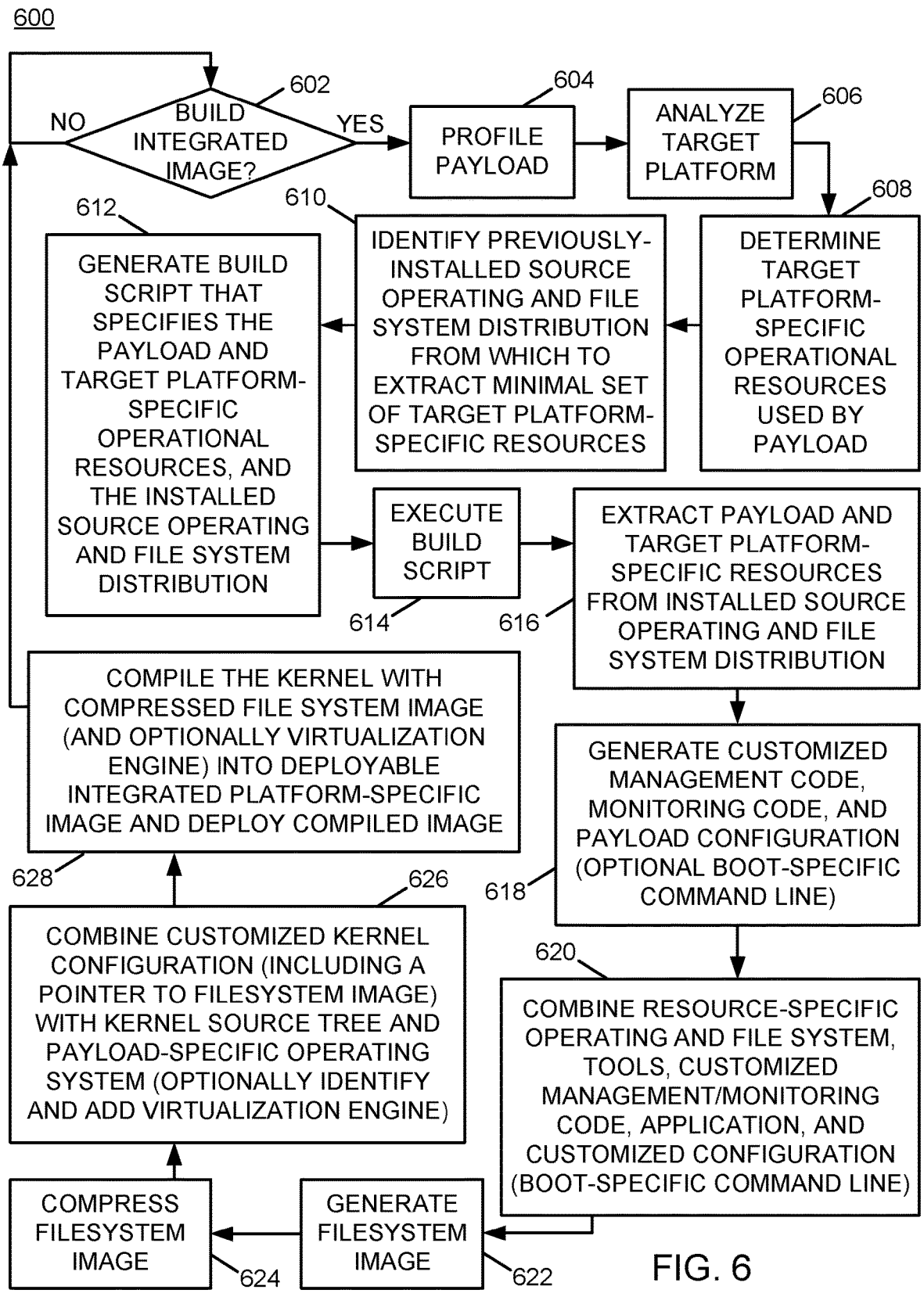
FIG. 6 is a flow chart of an example of an implementation of a process for building integrated resource-embedded bootable kernel images according to an embodiment of the present subject matter.

FIG. 6 is a flow chart of an example of an implementation of a process 600 for building integrated resource-embedded bootable kernel images. The process 600 represents a computer-implemented method of performing the subject matter described herein. It should be noted that there are several variations on options for construction of an integrated resource-embedded bootable kernel image. For example, the payload of an integrated resource-embedded bootable kernel image includes a reduced native kernel, alternatively termed herein a "compressed platform-specific operating system kernel." The image payload also includes a bootable file system that allows autonomous booting of the reduced native kernel on a given platform, again without reliance upon availability or access to an external file system. The image payload includes an application interface code library and integrated operating system kernel tools. The image payload may also optionally include an application or series of applications and/or operating system containers (e.g., Docker® containerized computer program applications). The image payload may also optionally include a virtualization engine that supports running of virtual machines. As such, many alternatives exist for construction and deployment of integrated resource-embedded bootable kernel images, and all such possibilities are considered within the scope of the present description.

At decision point 602, the process 600 makes a determination as to whether to build an integrated resource-embedded bootable kernel image. The determination may be based upon an external request, for example, that includes a target platform specification (e.g., a particular cloud provider platform) and/or a particular application or virtual machine to be deployed to a given platform.

In response to determining to build an integrated resource-embedded bootable kernel image, at block 604 the process 600 profiles the intended payload of the integrated resource-embedded bootable kernel image to be constructed. For example, the process 600 may determine the shared libraries an application uses, as well as the application itself, and other information usable to tailor the constructed integrated resource-embedded bootable kernel image for efficient deployment (e.g., size, runtime efficiency, etc.) with a minimal set of resources that support the intended payload. A profile of the payload may be generated using tools such as a Linux® device driver (ldd) to determine the shared libraries and application uses, as well as the application itself.

At block 606, the process 600 analyzes the target platform to determine particular technical aspects of the target operating platform. At block 608, the process determines target platform-specific operational resources used by the intended payload. For example, the process 600 may identify cloud platform-specific drivers and other resources that are specifically used by the payload. The process 600 may take into consideration differences between target platforms, and thereby further tailor the constructed integrated resource-embedded bootable kernel image for efficient operation, again with a minimal resource set selected specifically to support the payload on the target platform.

At block 610, the process 600 identifies a previously-installed source operating and file system distribution from which to extract a minimal set of target platform-specific resources. The process 600 may harvest resources for use in the image from the previously-installed source operating and file system distribution. For example, the process 600 may identify a source code distribution of a Linux® computer operating system and kernel from which to harvest the determined target platform-specific minimal set of resources. For example, where a source Linux® computer operating system and kernel is used, the process 600 may obtain operating system libraries, operating system utilities and libraries (e.g., tools such as Busybox), any specific management applications, and other operating system elements to be used by the constructed image. A source Linux® computer operating system and kernel distribution may, for example, be installed into a directory path such as "/opt/build-source/ubuntu/trusty/latest/" and this path may be called a "chroot environment," which changes the root directory for running purposes. This type of installation may be considered a complete installed file system of a Linux® computer operating system. However, it should be noted that any operating system distribution may be used as the source distribution, or an operating system may be built from scratch for deployment within the constructed image, as appropriate for a given implementation.

At block 612, the process 600 generates a build script that specifies the payload and target platform-specific operational resources and installed source operating and file system distribution. The build script contains the logic for building the integrated resource-embedded bootable kernel image.

At block 614, the process 600 executes the build script. At block 616, the process 600 extracts payload and target platform-specific resources from the installed source operating and file system distribution. For purposes of reducing storage space, reducing distribution bandwidth, and increasing resource usage efficiency for the constructed image, the build script may extract a minimum set of files from the operating system (e.g., libraries, programs, etc.). The build script uses the generated payload profile and the determined payload target platform resource use information to know what to extract and to optimize the extraction and processing of elements from the source operating and file system distribution.

At block 618, the process 600 generates customized management code, monitoring code, and payload configuration, including an optional boot-specific command line to be executed in association with booting the integrated resource-embedded bootable kernel image. The process 600 may also configure a customized kernel configuration used to configure the kernel when booted from the constructed image.

At block 620, the process 600 combines the resource-specific operating and file system, tools, customized management/monitoring code, application, and customized configuration (including the optional boot-specific command line). The process 600 may include an integrated configuration management and continuous delivery software application usable to pull the applications from the network for combination. Alternatively, the process 600 may invoke separate configuration management and continuous delivery software applications/tools (e.g., GNU® computer software development tools, Ansible® network operating system programs, etc.) that may be used to pull applications from a network for combination, as appropriate for a given implementation.

At block 622, the process 600 generates a file system image. The file system image may be constructed in a copy-in copy-out (CPIO) format.

At block 624, the process 600 compresses the file system image. This aspect may alternatively be formed and integrated with the build script that was generated as described above.

At block 626, the process 600 combines the customized kernel configuration, including a pointer to the generated file system image, with the kernel source tree and the payload-specific operating system. The process 600 may optionally identify and add a virtualization engine. The process 600 may also optionally add an optional boot-specific command line if part of the configuration.

At block 628, the process 600 compiles the kernel with the compressed file system image, and optionally with the virtualization engine, into a deployable integrated platform-specific image and deploys the compiled image. The compiled image may be configured with a specific set of configuration options that include support for the virtual hardware of the target cloud platform and that include a specific set of network options for the type of solution being deployed (e.g., some bridging and tunneling options, etc.). As such, the resulting operating system kernel file includes the operating system kernel, and also includes the compressed file system image integrated inside of the kernel. It should further be noted that the image may be deployed via continuous integration/continuous delivery (CI/CD), or a similar approach, to the cloud, or may be deployed via another approach (direct deployment, etc.), as appropriate for a given implementation.

It should be noted that the technology described herein differs considerably from previous cloud deployments that supply "all" of the supported drivers in module form and then load the modules from disk via a command interface (e.g., system, etc.). The technology described herein instead utilizes a profile for the target cloud platform and deploys platform-specific images that are tailored to the particular platform and payload being deployed.

As such, the process 600 profiles an intended payload and the intended target platform, and identifies and extracts payload and platform-specific operational resources (e.g., libraries, file system, etc.) from a general operating system distribution. The process 600 generates tailored configuration information, and generates implementation-specific management/monitoring code. The process 600 combines these custom-selected and configured elements, optionally along with one or more applications and/or a virtualization engine, and optionally with a boot-specific command, into a compact single resource-embedded bootable kernel image. As described above, the distributed image may be considerably smaller than conventional deployments, and may provide certainty with respect to resource availability during booting of the kernel because the operating system resources are integrated into the kernel image.

Figure 7A:
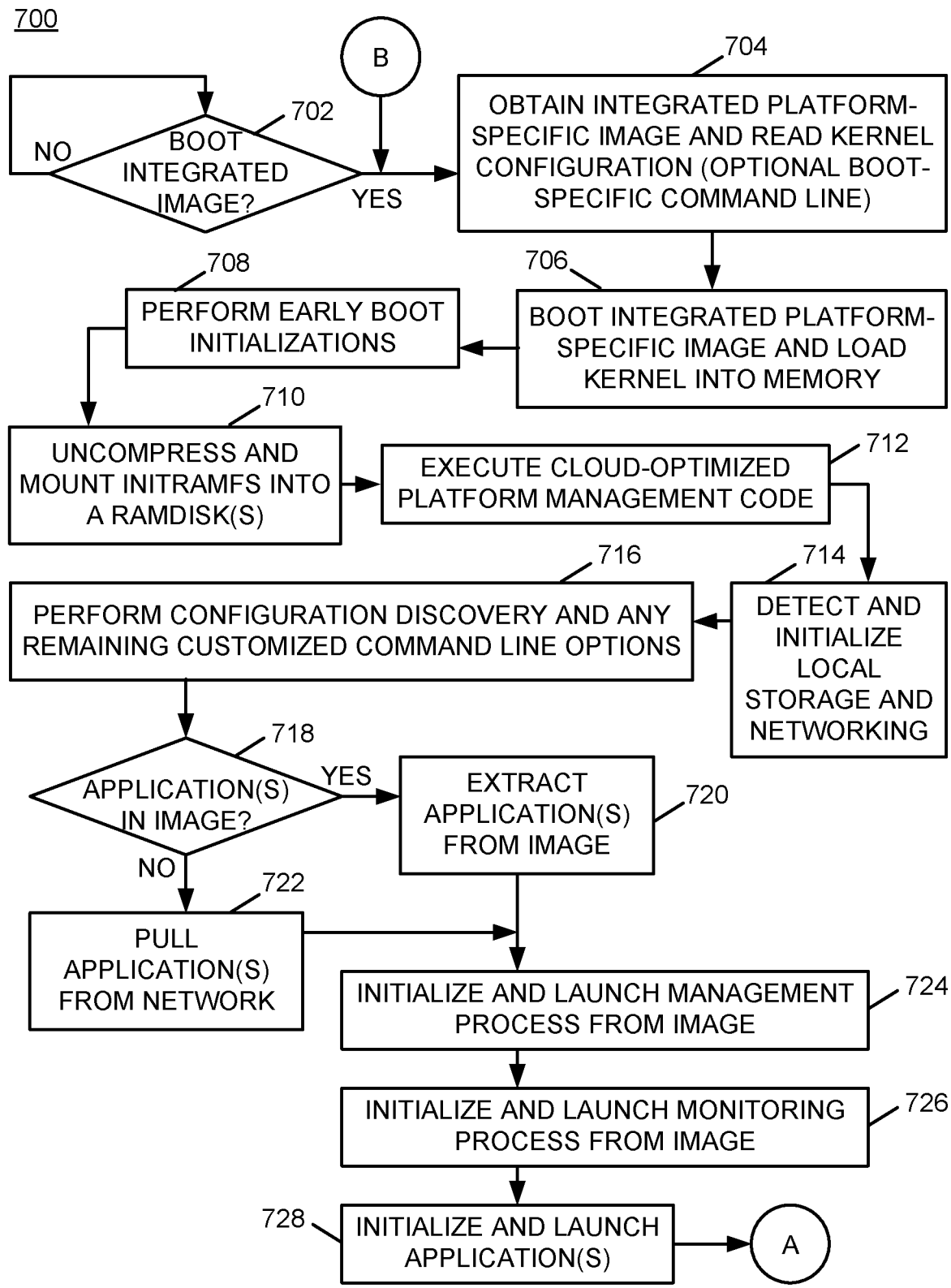
FIG. 7A is a flow chart of an example of an implementation of initial processing within a process for booting a resource-embedded bootable kernel image that includes a cloud-optimized operating system and that is usable to launch integrated applications according to an embodiment of the present subject matter.
Figure 7B:
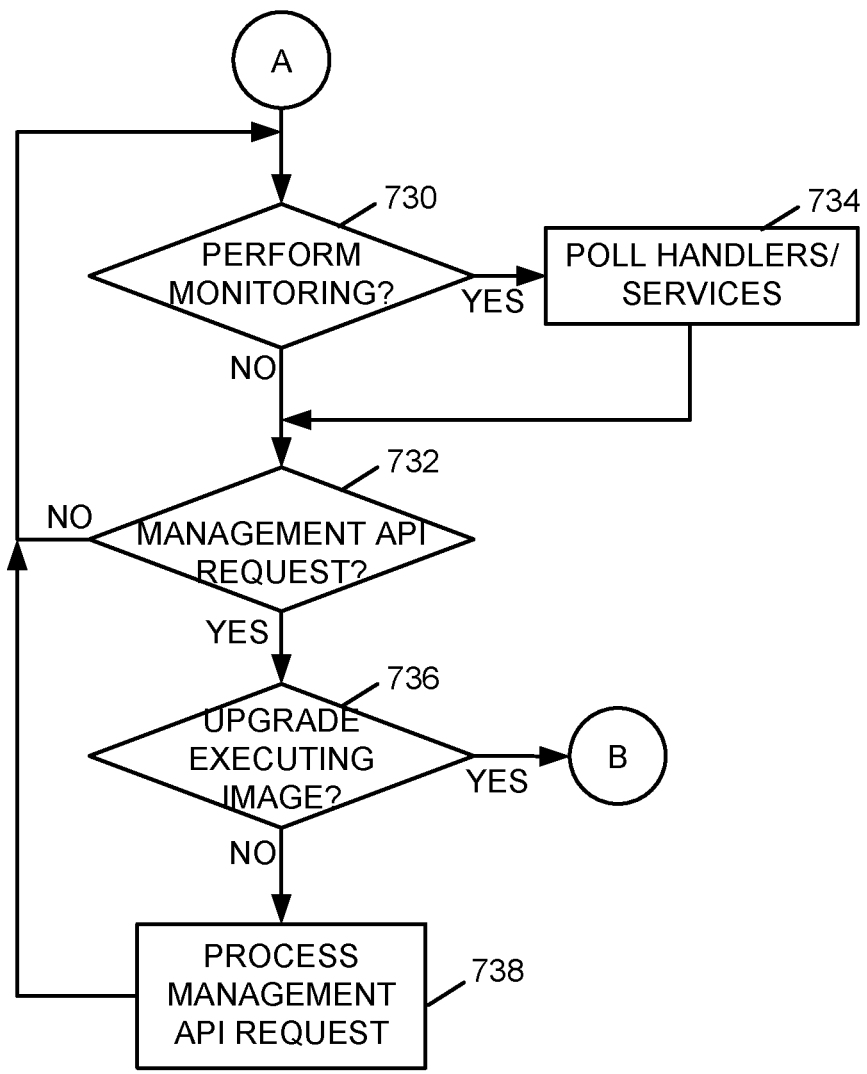
FIG. 7B is a flow chart of an example of an implementation of additional processing within a process for booting a resource-embedded bootable kernel image that includes a cloud-optimized operating system and that is usable to launch integrated applications according to an embodiment of the present subject matter.

FIGS. 7A-7B illustrate a flow chart of an example of an implementation of a process 700 for booting a resource-embedded bootable kernel image that includes a cloud-optimized operating system and that is usable to launch integrated applications. The process 700 represents a computer-implemented method of performing the subject matter described herein. FIG. 7A illustrates initial processing within the process 700. At decision point 702, the process 700 makes a determination as to whether to boot an integrated resource-embedded bootable kernel image. This determination may be performed by an image deployment device to perform a network boot of the operating system kernel file that includes the integrated resource-embedded bootable kernel.

In response to determining to boot an integrated resource-embedded bootable kernel image, at block 704 the process 700 obtains the integrated platform-specific image and reads a kernel configuration and an optional boot-specific command line. It should be noted that the technology described herein also enables a runtime replacement/upgrade of an integrated resource-embedded bootable kernel after one is already loaded and is executing without taking the underlying platform out of service, as described above and in more detail below.

At block 706, the process 700 boots the integrated platform-specific image and loads the kernel into memory at the target platform. The booting of the image may be performed using a platform boot loader or other tool, and may be performed on direct hardware or virtualized hardware, as appropriate for a given implementation. For example, the booting may be performed by direct disk, by a network boot (e.g., by use of a preboot execution environment (PXE)), or via a supported bootloader, as appropriate for a given implementation. The booting may include execution of the boot-specific command line if present within the image.

Once the kernel is loaded into memory, the boot manager in the image begins processing and then hands processing to the kernel. At block 708, the process 700 performs early boot initializations, such as for the hardware and operating system. At block 710, the process 700 uncompresses the initramfs that is embedded in the image, and mounts the initramfs into one or more ramdisks. This places the root file system (e.g., "I") in memory with the file system in the CPIO format that was generated and embedded into the kernel, as described above with reference to FIG. 6.

At block 712, the process 700 executes cloud-optimized platform management code. The kernel may hand-off processing to an initialization (e.g., "init") process that is also embedded within the image file (e.g., "/init") and that contains the customized code of the image that manages the cloud-optimized platform.

It should be noted that, at this point, the integrated resource-embedded bootable kernel is booted and takes over processing within the process 700, and the remainder of the payload-specific processing may be performed. This processing may also be performed on direct hardware or on virtualized hardware, again as appropriate for the given implementation. At block 714, the process 700 detects and initializes local storage and networking.

At block 716, the process 700 performs configuration discovery and any remaining customized command line options. For example, the process 700 may check for local configuration file(s) in the initramfs (e.g., /path/to/some/ configs). The process 700 may parse the kernel command line to identify any specified configuration information (e.g., /proc/cmdline as created as a part of the image file if constructed with a boot-specific command line).

It should be noted that one or more applications to be executed by the kernel may be included within the integrated resource-embedded bootable kernel image. Alternatively, one or more applications may be subject to distribution restrictions or may be of a size such that separate retrieval of the respective application(s) may be more appropriate.

At decision point 718, the process 700 makes a determination as to whether the payload of the integrated resource-embedded bootable kernel image includes the application(s) to be executed by the kernel. It should further be noted that where more than one application is to be executed by the kernel, one or more may be included within the image file, and one or more may be separately retrieved, as also appropriate. As such, the processing described below is not to be considered exclusive to a branch of processing because both branches may be utilized as appropriate for the particular implementation.

In response to determining at decision point 718 that the payload of the integrated resource-embedded bootable kernel image includes the application(s) to be executed by the kernel, the process 700 extracts the application(s) from the image file at block 720. Alternatively, in response to determining that the payload of the integrated resource-embedded bootable kernel image does not include the application(s) to be executed by the kernel, the process 700 pulls any applications from the network at block 722. Again, both branches of processing may be traversed as appropriate.

Further regarding the retrieval of one or more applications from the network, the process 700 may pull additional applications from the network, such as via the image that is downloaded, mounted, and executed. It should be noted that this approach may be utilized to comply with licensing requirements where an application is proprietary and subject to distribution restrictions. Alternatively, the process 700 may pull down the configuration information and applications via interactive tools such as GIT, which may also be utilized to pull down an updated/new image. As another alternative, the process 700 may utilize a configuration management and continuous delivery software application or another CI/CD tool to utilize a network source to provision the system and start services.

In response to extracting the application(s) from the image file at block 720 and/or in response to pulling any application(s) from the network at block 722, the process 700 initializes and launches a management process from the integrated resource-embedded bootable kernel image at block 724. The management process may provide an application programming interface (API) usable to control the deployment by providing access to the management process for use by an external cloud management system and to allow visibility into the cloud instance from the external system. The management process may be implemented as a runtime language or runtime interpreter application, as a hypertext transfer protocol (HTTP)-based representational state transfer (REST) API/web framework, or otherwise as appropriate for a given implementation.

At block 726, the process 700 initializes and launches a monitoring process from the integrated resource-embedded bootable kernel image. The monitoring process monitors the network, applications, and the system upon which the kernel and applications are executing. The monitoring process may also be implemented as a customized runtime language or runtime interpreter application, as an HTTP-based REST API/web framework, as a service discovery process/system, or otherwise as appropriate for a given implementation.

At block 728, the process 700 initializes and launches the application(s) to be hosted by the kernel. The process 700 transitions to the processing shown and described in association with FIG. 7B.

FIG. 7B illustrates additional processing associated with the process 700 for booting a resource-embedded bootable kernel image that includes a cloud-optimized operating system and that is usable to launch integrated applications. At decision point 730, the process 700 enters an iterative processing loop by determining whether to perform configured monitoring of the network, application(s), or system. It should be noted that the monitoring may be performed at specified intervals, or otherwise as appropriate for a given implementation. As such, the monitoring may be continual or occur otherwise as configured.

As part of the iterative loop, in response to determining not to perform configured monitoring of the network, application(s), or system, the process 700 makes a determination at decision point 732 as to whether a management API request has been detected. In response to determining that a management API request has not been detected, the process 700 returns to decision point 730 and iterates as described above.

Returning to the description of decision point 730, in response to determining to perform configured monitoring of the network, application(s), or system, the process 700 polls the respective handlers and/or services for configured monitoring information at block 734. The process 700 returns to decision point 732 and iterates as described above.

Returning to the description of decision point 732, in response to determining that a management API request has been detected, the process 700 makes a determination at decision point 736 as to whether a request to upgrade the deployed executing kernel image has been received. As described above, the resource-embedded bootable kernel image may be replaced during runtime (e.g., on the fly) without restarting the underlying system or platform upon which the kernel is executing.

In response to determining that a request to upgrade the deployed executing kernel image has not been received, the process 700 processes the management API request at block 738. For example, the process 700 may respond to an inquiry for monitoring information, or perform other processing as appropriate for a given implementation. The process 700 returns to decision point 730 and iterates as described above.

Alternatively, in response to determining at decision point 736 that a request to upgrade the deployed executing kernel image has been received, the process 700 returns to processing described above within FIG. 7A at block 704 and iterates as described above to obtain the new image, boot the new version of the platform-specific image, load the kernel into memory, and perform the processing described above. As such, the process 700 may replace the resource-embedded bootable kernel image during runtime (e.g., on the fly) without restarting the underlying system or platform upon which the kernel is executing. Example executable options applicable to the Linux® computer operating system may include providing a configured boot-specific command line that executes the upgrade, such as "kexec −1 bzImage.new," followed by a command "kexec −e."

As described above, the process 700 provides for booting a resource-embedded bootable kernel image that includes a cloud-optimized operating system and that is usable to launch integrated applications. One or more integrated applications are launched in conjunction with management and monitoring processes. The resource-embedded bootable kernel image itself may be upgraded during runtime.

Figure 8A:
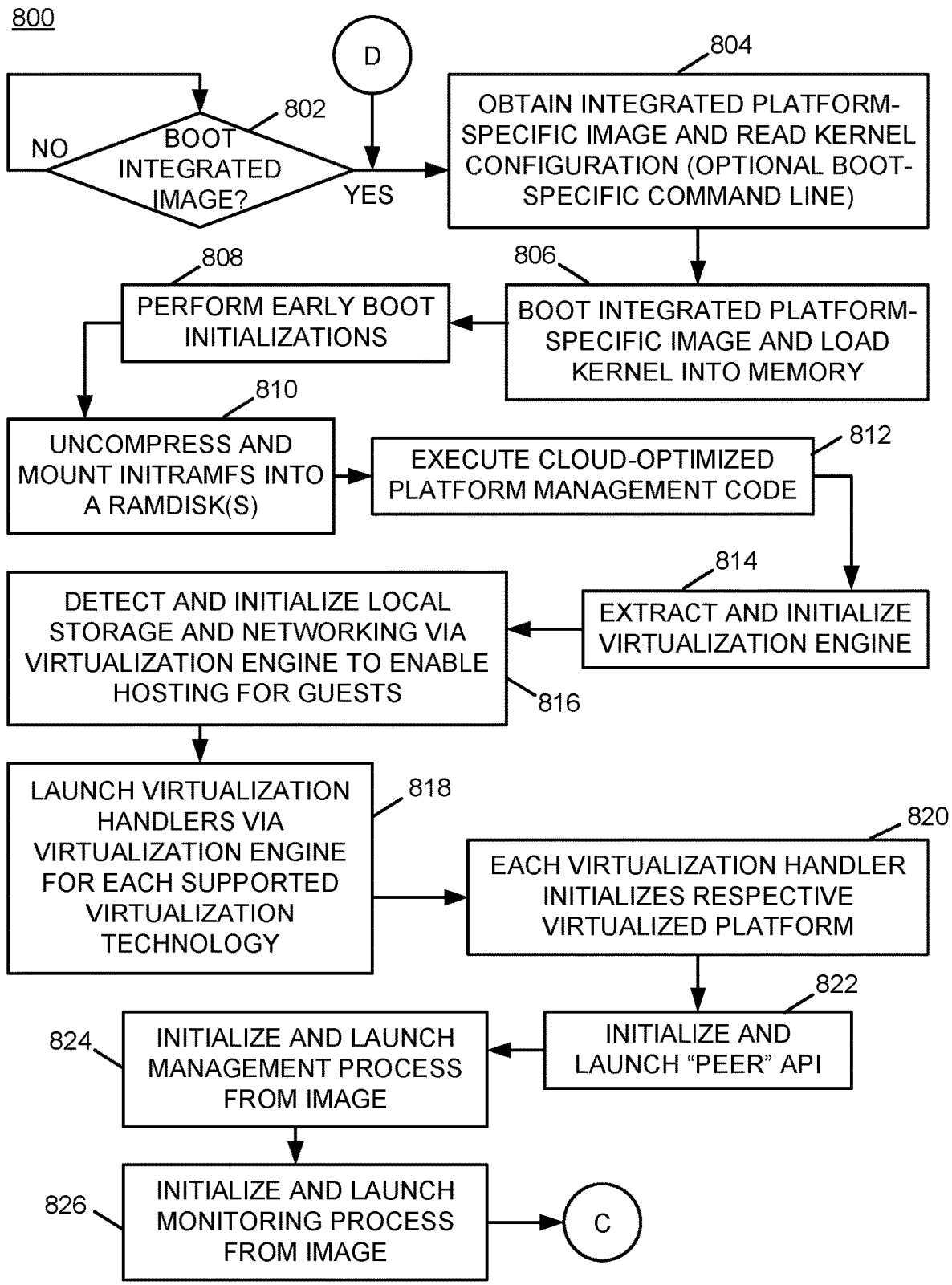
FIG. 8A is a flow chart of an example of an implementation of initial processing within a process for booting a resource-embedded bootable kernel image that includes a cloud-optimized operating system and a virtualization engine and that is usable to launch integrated virtual machines according to an embodiment of the present subject matter.
Figure 8B:
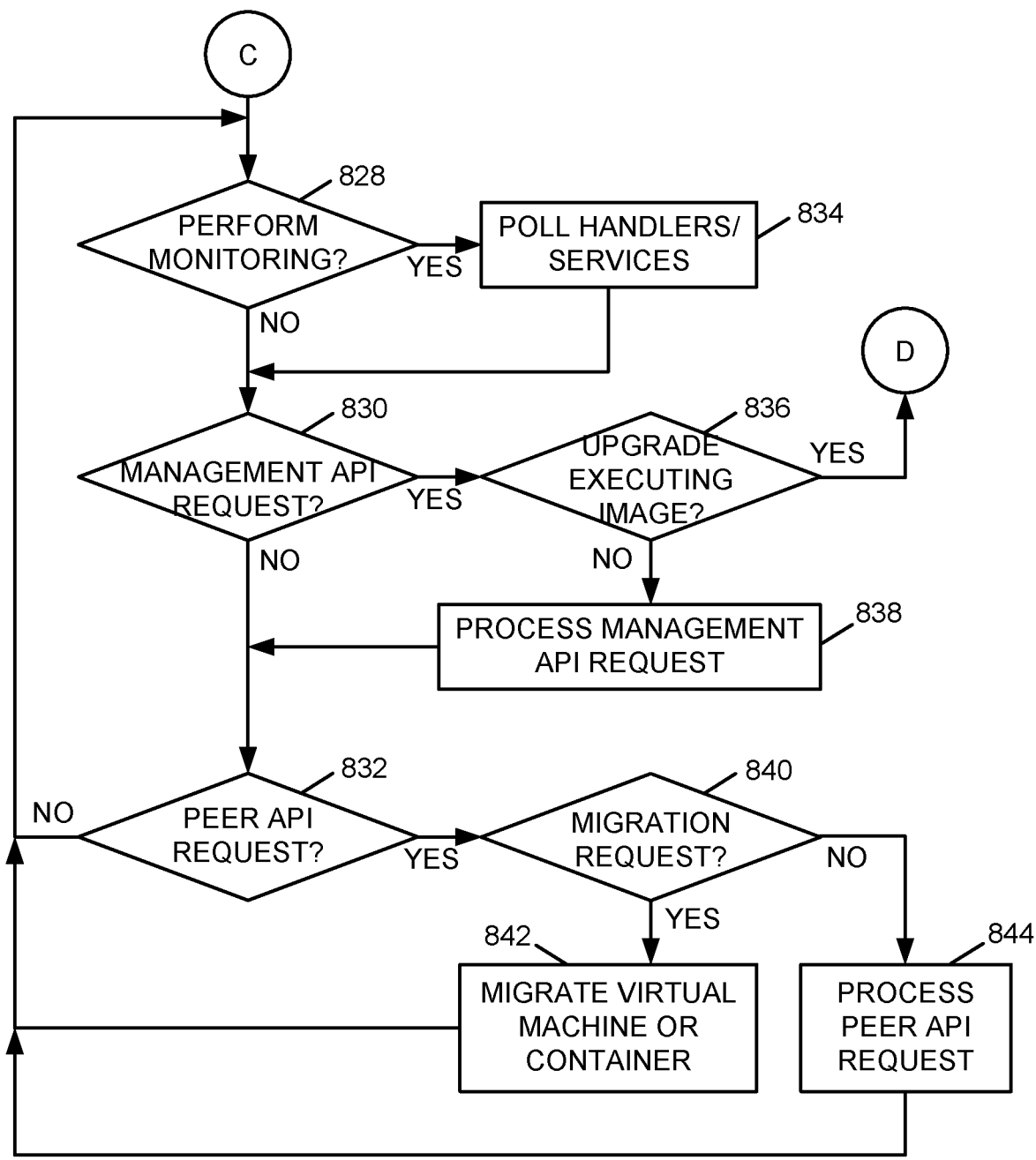
FIG. 8B is a flow chart of an example of an implementation of additional processing within a process for booting a resource-embedded bootable kernel image that includes a cloud-optimized operating system and a virtualization engine and that is usable to launch integrated virtual machines according to an embodiment of the present subject matter.

FIGS. 8A-8B illustrate a flow chart of an example of an implementation of process 800 for booting a resource-embedded bootable kernel image that includes a cloud-optimized operating system and a virtualization engine and that is usable to launch integrated virtual machines. The process 800 represents a computer-implemented method of performing the subject matter described herein. FIG. 8A illustrates initial processing within the process 800. It should be noted that certain portions of the initial processing and certain other portions of the processing shown and described with respect to FIG. 8A and the process 800 below are similar to those shown and described above with respect to FIG. 7A and the process 700. These similarities result from similarities in the initial processing of the respective operating system kernel files, and monitoring and management activities. Beyond these similarities, the process 800 provides kernel-integrated virtualization hosting rather than guest options as provided by the process 700 described above. It should be noted that an implementation of the technology described herein may enable both host and guest operations, and may run the kernel integrated virtualization platform in the cloud along with hosting applications that use the virtualization platform. Within the process 800 the kernel is booting into a virtualization engine that provides virtualization services, and may support any virtualization platform for which it is configured (e.g., container-based platforms, full hardware virtualization, intermediary (middle-man) orchestration systems, etc.).

At decision point 802, the process 800 makes a determination as to whether to boot an integrated resource-embedded bootable kernel image. This determination may be performed by an image deployment device to perform a network boot of the operating system kernel file that includes the integrated resource-embedded bootable kernel.

In response to determining to boot an integrated resource-embedded bootable kernel image, at block 804 the process 800 obtains the integrated platform-specific image and reads a kernel configuration and an optional boot-specific command line. It should be noted that the technology described herein also enables a runtime replacement/upgrade of an integrated resource-embedded bootable kernel after one is already loaded and is executing without taking the underlying platform out of service, as described above and in more detail below. Further, for the virtualization platform, hosting configuration options may include enablement of specific hardware options if the image is running on actual hardware instead of virtual hardware. Additionally, it should be noted that the technology described herein also supports nesting of virtual machines (e.g., running a KVM on top of another instance of a KVM).

At block 806, the process 800 boots the integrated platform-specific image and loads the kernel into memory at the target platform. The booting of the image may be performed using a platform boot loader or other tool, and may be performed on direct hardware or virtualized hardware, as appropriate for a given implementation. For example, the booting may be performed by direct disk, by a network boot (e.g., by use of a preboot execution environment (PXE)), or via a supported bootloader, as appropriate for a given implementation. The booting may include execution of the boot-specific command line if present within the image.

Once the kernel is loaded into memory, the boot manager in the image begins processing and then hands processing to the kernel. At block 808, the process 800 performs early boot initializations, such as for the hardware and operating system. At block 810, the process 800 uncompresses the initramfs that is embedded in the image, and mounts the initramfs into one or more ramdisks. This places the root file system (e.g., "/") in memory with the file system in the CPIO format that was generated and embedded into the kernel, as described above with reference to FIG. 6.

At block 812, the process 800 executes cloud-optimized platform management code. The kernel may hand-off processing to an initialization (e.g., "init") process that is also embedded within the image file (e.g., "/init") and that contains the customized code of the image that manages the cloud-optimized platform.

It should be noted that, at this point, the integrated resource-embedded bootable kernel is booted and takes over processing within the process 800, and the remainder of the payload-specific processing may be performed. This processing may also be performed on direct hardware or on virtualized hardware, again as appropriate for the given implementation. At block 814, the process 800 extracts and initializes a virtualization engine from the integrated resource-embedded bootable kernel image.

At block 816, the process 800 detects and initializes local storage and networking via the virtualization engine to enable hosting for guest services on the platform. The process 800 initializes the local storage and networking in such a way that it may be used by the guests, as appropriate for a given implementation. For example, the initialization process may create a structured directory tree on the disk, such as /opt/virtualization/{engine}/{guest}, where {engine} may be a container-based or kernel-based virtual machine, etc. The "{engine}" field may include an identifier that distinguishes the respective virtualization engines from one another. The "{guest}" field represents a unique identifier for the respective guest service that is being hosted.

It should additionally be noted that the virtual machines that are executed may be incorporated into and may be a part of the image file from which the kernel and other resources are booted, as described above in association with FIGS. 7A and 7B. Specifically, the virtual machines may be customized to the platform and payload, as described further above.

At block 818, the process 800 launches virtualization handlers via the virtualization engine for each supported virtualization technology. The virtualization handlers may include container-based, kernel-based, and other forms of virtualization handlers. The virtualization handlers are "keyed" into (configured for) the respective virtualization technologies they support. As such, when the respective virtualization handlers launch a virtual machine or container, the respective handlers are aware what "services" those guests are providing. For example, this awareness may include a guest identifier, one or more Internet protocol (IP) addresses, ports that are used, transmission control protocol/user datagram protocol (TCP/UDP), and other information as appropriate for a given implementation. This awareness may also include specific payload information, such as Layer 7 health checking (such as via retrieval of a specific webpage or uniform resource locator (URL)).

The virtualization handlers may be implemented as separate processes or may be implemented as separate threads within the virtualization engine, as appropriate for a given implementation. At block 820, the process 800 passes control to the virtualization handlers and each virtualization handler initializes the respective virtualized platform. For example, a container-based virtualization may launch Dockerd, prepare another union file system (AuFS), trigger the deployment of containers based on the Dockerd configuration, and perform other virtualization configuration operations. Similarly, a KVM handler may configure the virtualized platform using either a configuration tool (e.g., libvirt) or directly. Plugins may be launched, and other processing may be performed as appropriate for a given implementation. The virtualization handlers may run and manage their respective containers or virtual machines.

At block 822, the process 800 initializes and launches a "peer" application programming interface (API). The peer API provides an interface for information exchange and for migration of virtual machines and/or container services between peer platforms (e.g., between kernels instantiated from integrated resource-embedded bootable kernel images as described herein).

At block 824, the process 800 initializes and launches a management process from the integrated resource-embedded bootable kernel image. The management process may provide an application programming interface (API) usable to control the deployment by providing access to the management process for use by an external cloud management system and to allow visibility into the cloud instance from the external system. The management process may be implemented as a runtime language or runtime interpreter application, as a hypertext transfer protocol (HTTP)-based representational state transfer (REST) API/web framework, or otherwise as appropriate for a given implementation.

At block 826, the process 800 initializes and launches a monitoring process from the integrated resource-embedded bootable kernel image. With respect to the process 800, the monitoring process may monitor the virtualization engine, the virtualization handlers, and individual virtual machines and container services, in addition to monitoring the network and the system upon which the kernel is executing. The monitoring process may use an API to poll the virtualization handlers to obtain monitoring information and the health of those VMs and/or containers from the actual virtualization technology directly. The monitoring process may then use the IP and port information or extra Layer 7 (e.g., URL) information to health check the service as well. This may include specifically-encoded functionality, or the information may be obtained and relayed into an existing cloud monitoring system. The monitoring process may exchange data with the management process via a custom API (e.g., representational state transfer (REST)), which allows that information to be relayed to an external system via the management process. The monitoring process may also be implemented as a customized runtime language or runtime interpreter application, as an HTTP-based REST API/web framework, as a service discovery process/system, or otherwise as appropriate for a given implementation. The process 800 transitions to the processing shown and described in association with FIG. 8B.

FIG. 8B illustrates additional processing associated with the process 800 for booting a resource-embedded bootable kernel image that includes a cloud-optimized operating system and a virtualization engine and that is usable to launch integrated virtual machines. At decision point 828, the process 800 enters an iterative processing loop by determining whether to perform configured monitoring of the network, application(s), or system. It should be noted that the monitoring may be performed at specified intervals, or otherwise as appropriate for a given implementation. As such, the monitoring may be continual or may occur otherwise as configured.

As part of the iterative loop, in response to determining at decision point 828 not to perform configured monitoring of the network, application(s), or system, the process 800 makes a determination at decision point 830 as to whether a management API request has been detected. In response to determining that a management API request has not been detected, the process 800 makes a determination at decision point 832 as to whether a peer API request has been detected. In response to determining that a peer API request has not been detected, the process 800 returns to decision point 828 and iterates as described above.

Returning to the description of decision point 828, in response to determining to perform configured monitoring, the process 800 polls the respective handlers and/or services for configured monitoring information at block 834. With respect to the process 800, the monitoring may include monitoring the virtualization engine, monitoring the virtualization handlers, and monitoring individual virtual machines and container services, in addition to monitoring the network and the system upon which the kernel is executing. The process 800 returns to decision point 830 and iterates as described above.

Returning to the description of decision point 830, in response to determining that a management API request has been detected, the process 800 makes a determination at decision point 836 as to whether a request to upgrade the deployed executing kernel image has been received. As described above, the resource-embedded bootable kernel image may be replaced during runtime (e.g., on the fly) without restarting the underlying system or platform upon which the kernel is executing.

In response to determining that a request to upgrade the deployed executing kernel image has not been received, the process 800 processes the management API request at block 838. For example, the process 800 may respond to an inquiry for monitoring information, or may perform other processing as appropriate for a given implementation. The process 800 returns to decision point 832 and iterates as described above.

Alternatively, in response to determining at decision point 836 that a request to upgrade the deployed executing kernel image has been received, the process 800 returns to processing described above within FIG. 8A at block 804 and iterates as described above to obtain the new image, boot the new version of the platform-specific image, load the kernel into memory, and perform the processing described above. As such, the process 800 may replace the resource-embedded bootable kernel image during runtime (e.g., on the fly) without restarting the underlying system or platform upon which the kernel is executing. Example executable options applicable to the Linux® computer operating system may include providing a configured boot-specific command line that executes the upgrade, such as "kexec −1 bzImage.new," followed by a command "kexec −e." As an alternative, this processing may be performed by the management process, where the management process receives an update via the API from an external source, downloads a new bzImage, kexec loads the new image, and kexec executes the new image, as described above.

Returning to the description of decision point 832, in response to determining that a peer API request has been detected, the process 800 makes a determination at decision point 840 as to whether the peer API request is a request to migrate a virtual machine or container. In response to determining that the peer API request is a request to migrate a virtual machine or container, the process 800 migrates the virtual machine or container between the local host and the peer platform at block 842. It should be noted that the migration of virtual machines and containers is bi-directional, such that the migration of the virtual machine or container may be to or from a peer platform.

Alternatively, in response to determining at decision point 840 that the peer API request is not a request to migrate a virtual machine or container, the process 800 processes the peer API request at block 844. Processing of the peer API request may include information exchange (which may also be bi-directional), responses to inquiries, or other processing as appropriate for the given implementation.

In response to migrating the virtual machine or container between the local host and the peer platform at block 842, or in response to processing the peer API request at block 844, the process 800 returns to decision point 828 and iterates as described above.

As described above, the process 800 provides for booting a resource-embedded bootable kernel image that includes a cloud-optimized operating system and a virtualization platform that is usable to host virtual machines. One or more virtual machines may be launched in conjunction with management and monitoring processes. The peer API provides for migration of virtual machines and/or containers between host platforms. The resource-embedded bootable kernel image itself may be upgraded during runtime.

As described above in association with FIG. 1 through FIG. 8B, the example systems and processes provide kernel-integrated instance-specific operational resources with virtualization. Many other variations and additional activities associated with kernel-integrated instance-specific operational resources with virtualization are possible and all are considered within the scope of the present subject matter.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A computer-implemented method, comprising:
    performing a network boot, from a compressed platform-specific operating system kernel, of a platform-specific operating system kernel that when booted (i) dynamically builds from the compressed platform-specific operating system kernel a bootable file system, wherein the compressed platform-specific operating system kernel is provided within an image file, wherein the image file is embedded with resources, and wherein the network boot is performed without reliance on external kernel references outside the image file, and (ii) boots application code;
    loading an application from the bootable file system; and
    providing, within the compressed platform-specific operating system kernel, a boot manager responsible for preparing local cloud storage, networking, and firewall support for a plurality of cloud providers, wherein the compressed platform-specific operating system kernel enables unilateral provisioning of an operational kernel and an operating file system within a cloud computing environment, with support for running virtual machines.

2. The computer-implemented method of claim 1, where the compressed platform-specific operating system kernel comprises a compressed platform-specific Linux computer operating system kernel, and where the compressed platform-specific operating system kernel further comprises an application interface code library of a GNU GLIBC library, and integrated operating system kernel tools of BusyBox.

3. The computer-implemented method of claim 1, where the compressed platform-specific operating system kernel further comprises support for running a virtual machine and the application comprises a virtual machine (VM).

4. The computer-implemented method of claim 1, where the compressed platform-specific operating system kernel is provided within a single image file of a size less than or equal to sixteen Megabytes (16 MB), wherein the image file is the single image file.

5. The computer-implemented method of claim 1, further comprising upgrading the platform-specific operating system kernel during runtime without taking a platform upon which the platform-specific operating system kernel is executing or the application out of service.

6. The computer-implemented method of claim 1, where the compressed platform-specific operating system kernel is provided within a single image file, wherein the image file is the single image file, and where the single image file is booted over a network using a network interface card (NIC) from a preboot execution environment (PXE) server supporting dynamic host configuration protocol (DHCP) and a bootstrap protocol (BOOTP).

7. The computer-implemented method of claim 1, where the compressed platform-specific operating system kernel uses initramfs to dynamically build the bootable file system.

8. A system, comprising:
a memory; and
a processor programmed to:
perform a network boot, via the memory from a compressed platform-specific operating system kernel, of a platform-specific operating system kernel that when booted (i) dynamically builds from the compressed platform-specific operating system kernel a bootable file system, wherein the compressed platform-specific operating system kernel is provided within an image file, wherein the image file is embedded with resources and wherein the network boot is performed without reliance on external kernel references outside the image file, and (ii) boots application code;
load an application from the bootable file system; and
provide, within the compressed platform-specific operating system kernel, a boot manager responsible for preparing local cloud storage, networking, and firewall support for a plurality of cloud providers, wherein the compressed platform-specific operating system kernel enables unilateral provisioning of an operational kernel and an operating file system within a cloud computing environment, with support for running virtual machines.

9. The system of claim 8, where the compressed platform-specific operating system kernel comprises a compressed platform-specific Linux computer operating system kernel, and where the compressed platform-specific operating system kernel further comprises an application interface code library of a GNU GLIBC library, and integrated operating system kernel tools of BusyBox.

10. The system of claim 8, where the compressed platform-specific operating system kernel further comprises support for running a virtual machine and the application comprises a virtual machine (VM).

11. The system of claim 8, where the compressed platform-specific operating system kernel is provided within a single image file of a size less than or equal to sixteen Megabytes (16 MB), wherein the image file is the single image file.

12. The system of claim 8, where the processor is further programmed to upgrade the platform-specific operating system kernel during runtime without taking a platform upon which the platform-specific operating system kernel is executing or the application out of service.

13. The system of claim 8, where the compressed platform-specific operating system kernel is provided within a single image file, wherein the image file is the single image file, and where the single image file is booted over a network using a network interface card (NIC) from a preboot execution environment (PXE) server supporting dynamic host configuration protocol (DHCP) and a bootstrap protocol (BOOTP).

14. The system of claim 8, where the compressed platform-specific operating system kernel uses initramfs to dynamically build the bootable file system.

15. A computer program product, comprising:
a computer readable storage medium having computer readable program code embodied therewith, where the computer readable storage medium is not a transitory signal per se and where the computer readable program code when executed on a computer causes the computer to:
perform a network boot, from a compressed platform-specific operating system kernel, of a platform-specific operating system kernel that when booted (i) dynamically builds from the compressed platform-specific operating system kernel a bootable file system, wherein the compressed platform-specific operating system kernel is provided within an image file, wherein the image file is embedded with resources, and wherein the network boot is performed without reliance on external kernel references outside the image file, and (ii) boots application code;
load an application from the bootable file system; and
provide, within the compressed platform-specific operating system kernel, a boot manager responsible for preparing local cloud storage, networking, and firewall support for a plurality of cloud providers, wherein the compressed platform-specific operating system kernel enables unilateral provisioning of an operational kernel and an operating file system within a cloud computing environment, with support for running virtual machines.

16. The computer program product of claim 15, where the compressed platform-specific operating system kernel comprises a compressed platform-specific Linux computer operating system kernel, and where the compressed platform-specific operating system kernel further comprises an application interface code library of a GNU GLIBC library, and integrated operating system kernel tools of BusyBox.

17. The computer program product of claim 15, where the compressed platform-specific operating system kernel further comprises support for running a virtual machine and the application comprises a virtual machine (VM).

18. The computer program product of claim 15, where the compressed platform-specific operating system kernel is provided within a single image file of a size less than or equal to sixteen Megabytes (16 MB), wherein the image file is the single image file.

19. The computer program product of claim 15, where the computer readable program code when executed on the computer further causes the computer to upgrade the platform-specific operating system kernel during runtime without taking a platform upon which the platform-specific operating system kernel is executing or the application out of service.

20. The computer program product of claim 15, where the compressed platform-specific operating system kernel is provided within a single image file, wherein the image file is the single image file, and where the single image file is booted over a network using a network interface card (NIC)

from a preboot execution environment (PXE) server supporting dynamic host configuration protocol (DHCP) and a bootstrap protocol (BOOTP).

21. The computer program product of claim 15, where the compressed platform-specific operating system kernel uses initramfs to dynamically build the bootable file system.

* * * * *